United States Patent [19]
Gustaveson et al.

[11] Patent Number: 5,501,042
[45] Date of Patent: Mar. 26, 1996

[54] BELOW-THE-CEILING MOUNTING FOR A TELEVISION RECEIVING SET OR A VIDEO PROJECTOR

[76] Inventors: Keith I. Gustaveson; Elsie E. Gustaveson, both of 1558 Palo Verde Way #22, Salt Lake City, Utah 84121

[21] Appl. No.: 289,705

[22] Filed: Aug. 12, 1994

[51] Int. Cl.⁶ ............................................ A47B 81/06
[52] U.S. Cl. .................. 52/39; 312/7.2; 312/242; 248/917
[58] Field of Search ........................ 52/39, 27, 26; 248/917, 923; 312/7.2, 242, 319.6

[56] References Cited

U.S. PATENT DOCUMENTS

| | | |
|---|---|---|
| 4,713,916 | 12/1987 | Brooks, Jr. ........................... 52/39 |
| 4,829,725 | 5/1989 | Gustaveson et al. . |
| 4,843,782 | 7/1989 | Gustaveson et al. . |
| 4,993,676 | 2/1991 | Fitts et al. ............................ 52/39 X |
| 5,148,282 | 9/1992 | Sedighzadeh ....................... 312/7.2 X |

*Primary Examiner*—Carl D. Friedman
*Assistant Examiner*—Yvonne Horton-Richardson
*Attorney, Agent, or Firm*—Mallinckrodt & Mallinckrodt

[57] ABSTRACT

The mounting of the invention comprises inner and outer shells, the former adapted to receive internally thereof a television-receiving set or a video projector and externally thereof operating mechanism for a door mounted to hinge at one end of an elongate viewing or projecting opening formed in the bottom of such inner shell, and the latter enclosing the former and being formed externally to visually comport with the ceiling so as to be decoratively compatible therewith in its protuberance below the ceiling. As such, the shells are preferably made of a moldable sheet material, the outer shell being reinforced peripherally of its upper expanse and peripherally of the viewing or projecting opening by respective structural frames, and the outer shell being adapted to fasten to an attachment frame that is itself adapted to be fastened to the exposed ceiling surface.

12 Claims, 2 Drawing Sheets

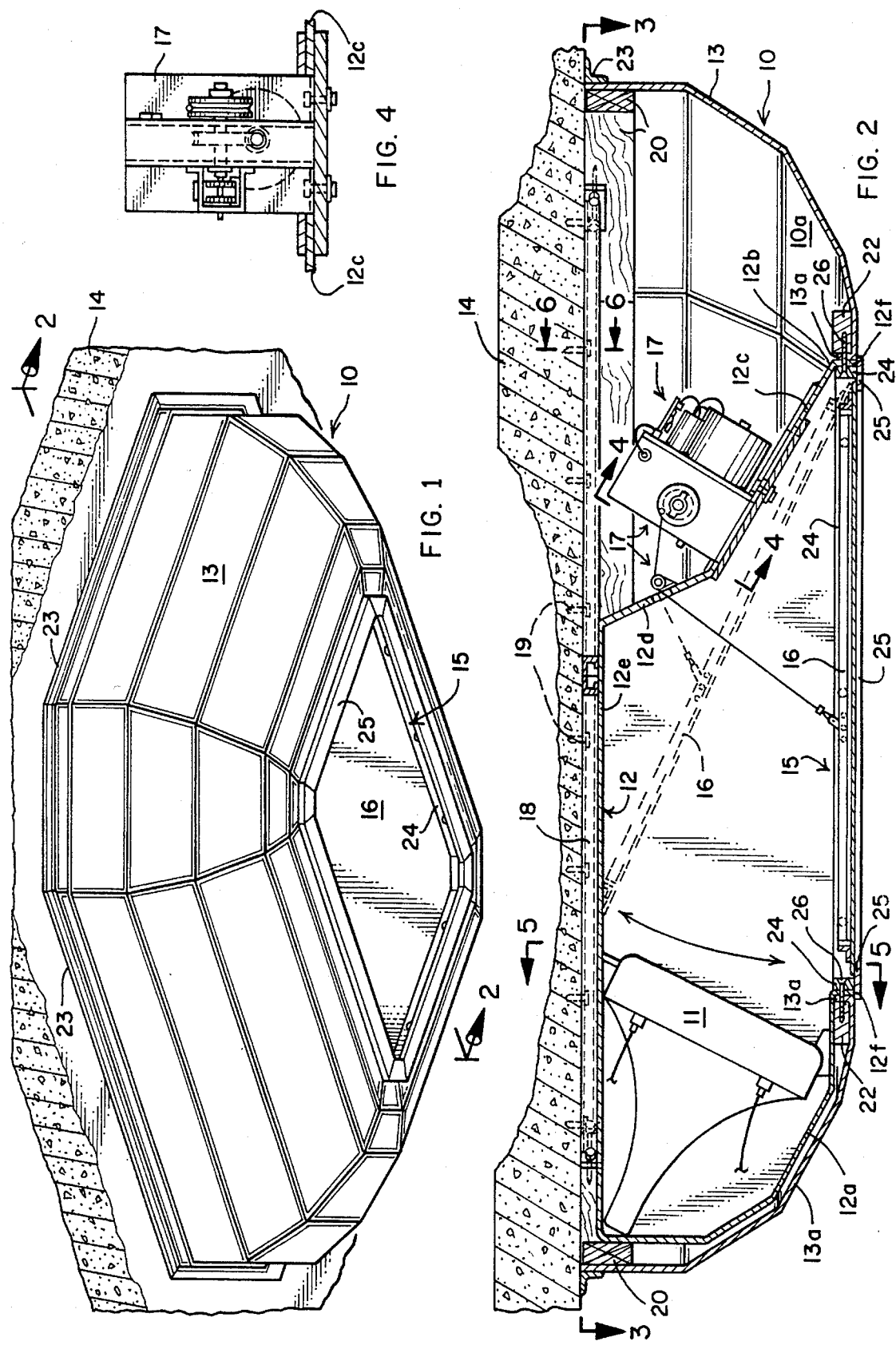

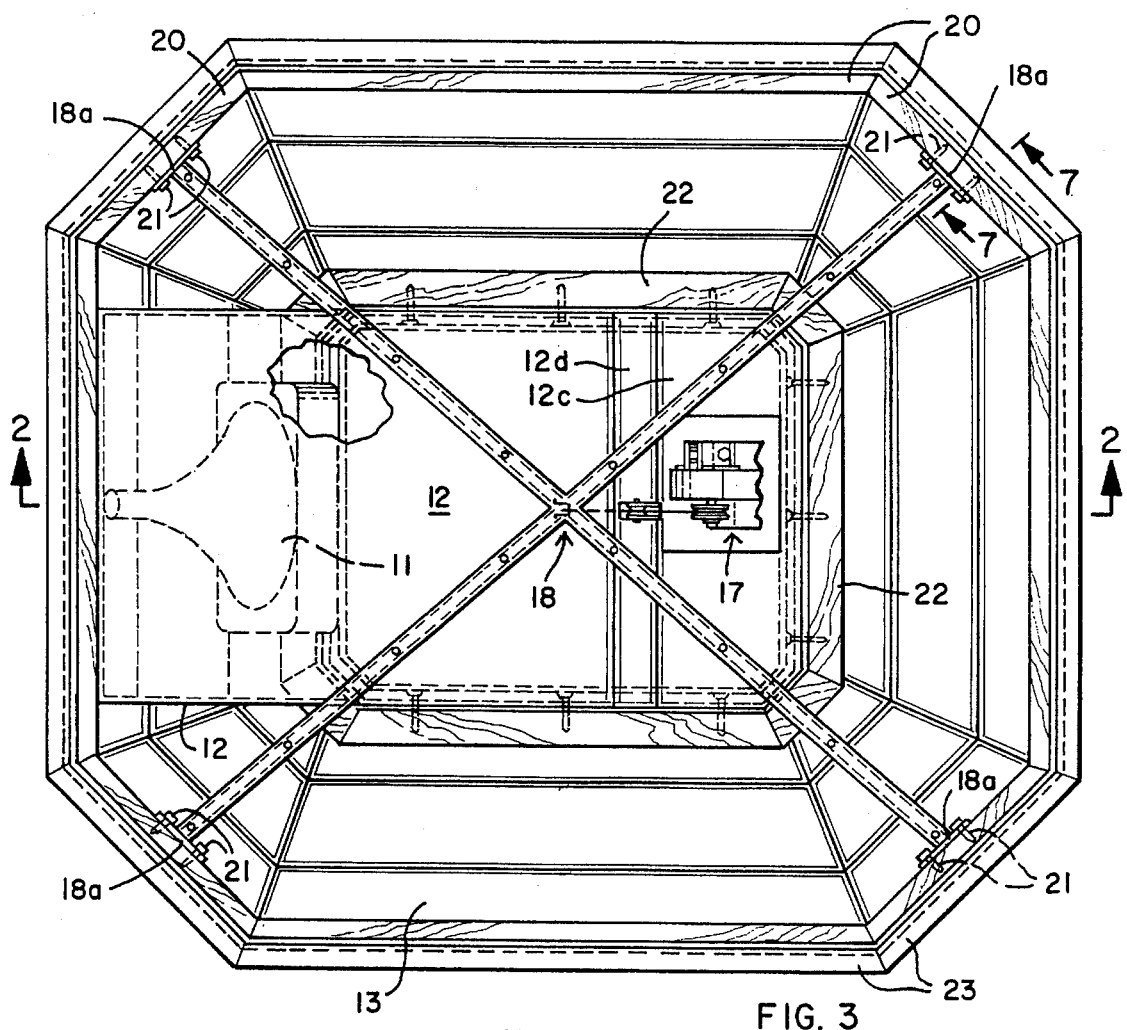
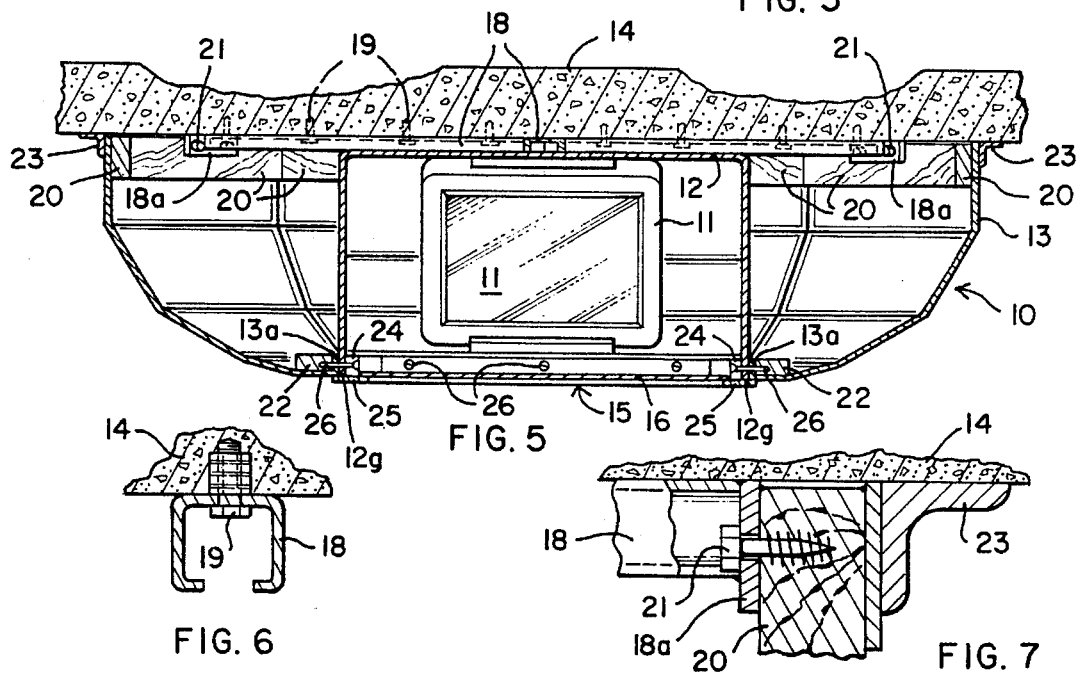
FIG. 3
FIG. 5
FIG. 6
FIG. 7

BELOW-THE-CEILING MOUNTING FOR A TELEVISION RECEIVING SET OR A VIDEO PROJECTOR

BACKGROUND OF THE INVENTION

Field: The invention is concerned with ceiling mountings for television receiving sets and video projectors.

State of the Art: Our two U.S. Pat. Nos. 4,829,725 of May 16, 1989 and 4,843,782 of Jul. 4, 1989, show behind-the-ceiling mountings for television receiving sets. However, there are many ceilings, as for example in multi-story buildings such as hotels, motels, and office buildings within or behind which ceilings there is no space for installation of the mountings of our aforenoted patents. Moreover, since the issuance of those patents, video projectors have come into use and are often attached directly to a ceiling of a room or other area into which the video image is to be projected onto a screen within such room or other area.

SUMMARY OF THE INVENTION

Accordingly, a principal objective in the making of the present invention was to provide a below-the-ceiling mounting for a television receiving set or a video projector, which mounting has advantages similar to those of our aforementioned patents but does not require space behind the ceiling and constitutes an unobjectionable protrusion from the ceiling into the living or working space covered by the ceiling concerned.

In achieving this objective, the mounting is provided by an inner shell which accommodates the television receiving set or video projector. An outer shell protectively covers the inner shell and is attached to the ceiling by means of an attachment frame, preferably of "Unistrut$_{TM}$" formation. Such outer shell protrudes downwardly so as to be decoratively compatible with the ceiling as a whole. The inner shell is attached to the outer shell so as to be also supported by the ceiling.

A desirable feature of the invention is the providing, exteriorly of the inner shell, for the mounting of the operating mechanism that opens a door for viewing or for projecting purposes and that thereafter closes the door. The outer shell normally wholly contains the inner shell and encloses such door-operating mechanism. The door is mounted to hinge upwardly and downwardly at one end thereof and at a corresponding end of coextensive openings in the outer and inner shells, respectively, which make up a viewing or projecting opening normally closed by the door.

THE DRAWINGS

The best mode presently contemplated for carrying out the invention is illustrated in the accompanying drawings, in which:

FIG. 1 is a pictorial view of the apparatus of the invention as attached to a mounting or attachment frame which is itself attached to a concrete ceiling of a room, the mounting frame and apparatus protruding below the ceiling for either the viewing, from below by a person in the room, of a television screen contained in the apparatus, or for the projection of a video image from a video projector contained in the apparatus on a screen within the room, the apparatus as illustrated having the viewing door closed and having one of many possible ornamental configurations for an appearance comporting with ceiling design;

FIG. 2, a longitudinal vertical section taken on the line 2—2 of FIG. 1, see also FIG. 3, drawn to a somewhat larger scale and showing, in broken lines, the door raised for viewing or projecting purposes;

FIG. 3, a horizontal section taken on the line 3—3 of FIG. 2, showing, in plan, the apparatus as attached to the mounting frame thereof, which frame is itself attached to the ceiling in the installing of the apparatus;

FIG. 4, a fragmentary, vertical section taken on the line 4—4 of FIG. 2 and drawn to a somewhat larger scale;

FIG. 5, a transverse, vertical section taken on the line 5—5 of FIG. 2 and drawn to a somewhat smaller scale;

FIG. 6, a fragmentary, transverse, vertical section taken on the line 6—6 of FIG. 2 and drawn to a larger scale; and FIG. 7, a fragmentary, vertical section taken on the line 7—7 of FIG. 3 and drawn to a larger scale.

DETAILED DESCRIPTION OF THE ILLUSTRATED EMBODIMENT

In the preferred construction of the apparatus of the invention as here illustrated, a housing 10 for a television receiving set 11, or for a usual video projector (not illustrated), is made up of two shells 12 and 13 to have an outward appearance, to a person within a room or other area covered by a ceiling 14, that pleasingly comports in its protrusion below the ceiling with such ceiling expanse. As such, it may be of overall ornamental design selected from a great number of possibilities that may be proposed by architects or interior designers. Housing 10 has a viewing or projecting opening 15 normally closed by a door 16 that is mounted to hinge at one of its ends, as in our earlier patents, for opening when it is desired to view television through such opening 15 or to view subject matter projected by a video projector through such opening.

The television receiving set 11 is indicated in FIGS. 2 and 3 by only the video tube and screen portions behind bulkheads 10a, respectively, of housing 10, the usual operating components thereof (not shown) being mounted in the surrounding space. However, FIGS. 1 and 5 show a commercial set installed as an operating unit in and of itself.

The shells 12 and 13 may be conveniently made of fiberglass-reinforced plastic by any well-known procedure, which usually comprises spraying onto the surfaces of a previously constructed mold a resin plastic into which pieces of chopped lengths of fiberglass are injected during the spraying of the resin from what is generally known as a "chopper gun". To provide pleasing finish surfaces exposed to view, a coat of a usually pigmented gel is applied to the mold prior to the fiberglass-reinforced structural coating or coatings, all in accordance with well-known practice. The shells could also be made from a so-called ABS material by a vacuum molding technique or could be otherwise fabricated.

As shown, the inner shell 12 is made with a segmented floor 12a at one end thereof, which overlies a corresponding outer shell wall 13a, both sloping downwardly toward the elongate viewing or projecting opening 15 that separates such inner shell floor from the opposite end 10a of the housing 10. In the illustrated embodiment, see FIG. 2, the opposite end 12b of the inner shell extends into the aforesaid opposite end 10a of housing 10 at the level of viewing or projecting opening 15 and slopes backwardly as at 12c to a more steeply sloping portion 12d so as to accommodate, as a mounting platform externally of such inner shell 12, an assembly of operating mechanism 17 for raising and lowering the elongate door 16. Sloping portion 12c of inner shell 12 could continue on its same slope to joinder with the top wall portion 12e to better accommodate auxiliary speakers (not shown) such as are shown in our previously noted patents.

Outer shell 13 encloses inner shell 12 and the door-operating mechanism 17 mounted thereon and provides the ultimate outer appearance for the apparatus of the invention that protrudes downwardly from ceiling 14. For attaching housing 10 to the concrete or similar ceiling, a structural frame 18 is preferably employed and is attached directly to the exposed surface of the ceiling as by well known expandable bolt assemblies 19 for concrete. Although the apparatus of the present invention was designed especially for ceilings that cannot accommodate behind-the-ceiling apparatus, it can also be used for ceilings which would accommodate our earlier patented apparatus.

The frame 18 is preferably made up of so-called "Unistrut$_{TM}$." members as illustrated, see FIGS. 3 and 5–7, and as produced by UDP of Ann Arbor, Mich., enabling standard concrete-attaching devices 19 to be used to conveniently and securely attach such frame to the ceiling, although other frame members and attaching devices could be used, especially if the behind-the-ceiling construction is of wood joist construction. Outer shell 13 may be attached to ceiling attachment frame 18 for convenience of marketing the apparatus of the invention, but may be sold separately. In either event, in installing the apparatus, such frame preferably is first attached to the ceiling separately, outer shell 13 of housing 10 being then pushed into place around it and attached thereto.

Outer shell 13 is preferably structurally reinforced internally thereof by an upper peripheral frame 20 (conveniently made from 2×4 dimensional lumber standing up as illustrated, FIGS. 2 and 5) closely received within the upper expanse of such shell between and secured to the lateral walls thereof by suitable fastening means (not shown) and secured to intersecting ends of frame 18 as by respective end plates 18a thereof and sets of screws 21, FIGS. 3 and 7, and is similarly structurally reinforced by a lower frame 22 (2×4's lying flat as shown), FIGS. 2 and 5, within upturned lower marginal edges 13a of the lateral walls of such outer shell 13 peripheral to the opening 15 for door 16.

Finish moulding strips 23 are preferably applied peripherally of the top of outer shell 13 to enhance the appearance of the apparatus as installed in place on the ceiling.

After frame 18 is attached to ceiling 14 by the fasteners 19 and outer shell is attached to it, inner shell 12 is inserted in the so-attached outer shell through the bottom opening therein that is peripherally defined by its upturned lower marginal edges 13a, a corresponding bottom opening in such inner shell being defined by down-turned marginal edges 12f, FIG. 2, and by lower marginal wall portions 12g, FIG. 5, of inner shell 12. When inner shell 12 is properly placed in outer shell 13 by way of the bottom opening in such outer shell, the bottom openings in outer and inner shells, therein, respectively, coincide to provide, within a door jam 24 and moulding strips 25 in common, the viewing or projection opening 15 that is normally closed by door 16. As so placed, inner shell is attached to outer shell 13 as by screws 26, FIGS. 2 and 5, and is thereby attached to and supported by attachment frame 18 and ceiling 14.

When the apparatus of the invention is installed in place on a ceiling, the door 16 is opened by remote control operation of the door-operating mechanism 17 as in our aforementioned patents, so that a person in the room or other area can comfortably view, through the opening 15, the screen of the television-receiving set, if that is the equipment contained by inner shell 12, while lying in bed, sitting, or standing, or can look at an image projected on a screen (not shown) in the area covered by the ceiling, which image is projected through door opening 15 onto such screen.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

We claim:

1. A below-the-ceiling mounting for a television receiving set or a video projector, comprising two shells of structural sheet material fastened together to cooperatively provide a visually unitary housing to fit against and suspend from the ceiling of a room or other viewing area in downwardly protruding orientation relative to said ceiling, one of said shells being within the other as an inner shell and having means for receiving, internally thereof, a television receiving set or a video projector in downwardly slanting orientation toward a viewing or projecting opening in the bottom of said housing; a door mounted to hinge in said housing for lifting and lowering to open and close, respectively, said opening; powered means within said housing for lifting and lowering said door under control from outside said housing; and the other of said shells covering said one shell and said powered means as an outer shell to provide visual compatibility between said housing protruding below the ceiling and the ceiling as a whole.

2. A below-the-ceiling mounting for a television receiving set or a video projector according to claim 1, wherein the inner shell has a bottom wall sloping downwardly toward the viewing or projecting opening and providing for the mounting thereat of a television-receiving set or a video projector internally of said inner shell for viewing or projecting through the opening, and has an upper wall at the opposite end thereof providing a platform area externally of said inner shell, the powered means for raising and lowering the door being mounted externally of said inner shell on said platform area.

3. A below-the-ceiling mounting for a television receiving set or a video projector according to claim 1, wherein the inner shell is wholly within the outer shell.

4. A below-the-ceiling mounting for a television receiving set or a video projector according to claim 3, including an attachment frame for fastening the housing to a ceiling surface.

5. A below-the-ceiling mounting for a television receiving set or a video projector according to claim 1, including an attachment frame for fastening the outer shell to a ceiling surface, the inner shell being fastened to the outer shell.

6. A below-the-ceiling mounting for a television receiving set or a video projector according to claim 5, including a television-receiving set or a video projector within the inner shell; and fastening devices attaching the attachment frame to a ceiling so said television-receiving set or video projector will be suspended below the ceiling.

7. A below-the-ceiling mounting for a television receiving set or a video projector according to claim 6, wherein the attachment frame comprises members of "Unistrut$_{TM}$." type.

8. A below-the-ceiling mounting for a television receiving set or a video projector according to claim 1, wherein the outer shell includes an upper structural frame peripheral to the upper expanse of the outer shell, and a lower structural frame peripheral to the viewing or projecting opening.

9. A below-the-ceiling mounting for a television receiving set or a video projector according to claim 1, wherein the viewing or projecting opening is formed by substantially coinciding bottom openings in the outer and the inner shells, respectively.

10. A below-the-ceiling mounting for a television receiving set or a video projector according to claim 1, wherein both the inner shell and the outer shell are made of moldable sheet material that has been molded to final shape.

11. A below-the-ceiling mounting according to claim 1, wherein said mounting is attached to and is suspended from a ceiling and projects downwardly therefrom; and there is a television-receiving set operatively mounted in the inner shell thereof.

12. A below-the-ceiling mounting according to claim 1, wherein said mounting is attached to a ceiling and projects downwardly therefrom; and there is a video projector operatively mounted in the inner shell thereof.

* * * * *